United States Patent
Maamari et al.

(10) Patent No.: US 12,432,787 B2
(45) Date of Patent: Sep. 30, 2025

(54) METHODS AND APPARATUS FOR COVERAGE ENHANCEMENT IN WIRELESS COMMUNICATION NETWORKS

(71) Applicant: Huawei Technologies Co., Ltd., Shenzhen (CN)

(72) Inventors: Diana Maamari, Palatine, IL (US); Brian Classon, Palatine, IL (US); Philippe Sartori, Naperville, IL (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 18/167,267

(22) Filed: Feb. 10, 2023

(65) Prior Publication Data

US 2023/0199861 A1 Jun. 22, 2023

Related U.S. Application Data

(63) Continuation of application No. PCT/US2021/044548, filed on Aug. 4, 2021.

(60) Provisional application No. 63/068,823, filed on Aug. 21, 2020.

(51) Int. Cl.
*H04W 74/0833* (2024.01)
*H04L 1/00* (2006.01)
*H04W 74/00* (2009.01)

(52) U.S. Cl.
CPC ....... *H04W 74/0841* (2013.01); *H04L 1/0003* (2013.01); *H04W 74/006* (2013.01)

(58) Field of Classification Search
CPC ............ H04W 74/0841; H04W 74/006; H04L 1/0003
See application file for complete search history.

(56) References Cited

U.S. PATENT DOCUMENTS

| | | | |
|---|---|---|---|
| 2018/0124790 A1* | 5/2018 | Yerramalli | H04W 72/0453 |
| 2020/0350949 A1* | 11/2020 | Rico Alvarino | H04L 5/0094 |
| 2020/0351844 A1* | 11/2020 | Rico Alvarino | H04L 5/0094 |
| 2021/0100004 A1* | 4/2021 | Yang | H04W 72/21 |
| 2021/0274556 A1* | 9/2021 | Park | H04L 1/0026 |
| 2022/0095379 A1* | 3/2022 | Xiong | H04W 74/0836 |
| 2024/0056115 A1* | 2/2024 | Zhou | H04B 7/0602 |

FOREIGN PATENT DOCUMENTS

WO 2020032748 A1 2/2020

OTHER PUBLICATIONS

"3rd Generation Partnership Project; Technical Specification Group Radio Access Network; NR; Radio Resource Control (RRC) protocol specification (Release 17)", 3GPP TS 38.331 V17.4.0, Technical Specification, (Mar. 2023), 1324 Pages.

(Continued)

*Primary Examiner* — Ajay Cattungal
(74) *Attorney, Agent, or Firm* — Slater Matsil, LLP

(57) ABSTRACT

A method implemented by an access node includes sending, by the access node to a user equipment (UE), an indicator indicating use of coverage enhancement technique, the indicator being sent prior to the UE achieving a radio resource control (RRC) connected state with the access node; receiving, by the access node from the UE, an uplink transmission in accordance with the indicator; and sending, by the access node to the UE, a contention resolution message in accordance with the indicator.

21 Claims, 7 Drawing Sheets

(56) References Cited

OTHER PUBLICATIONS

"3rd Generation Partnership Project; Technical Specification Group Radio Access Network; NR; Multiplexing and channel coding (Release 16)", GPP TS 38.212 V16.2.0, Technical Specification, (Jun. 2020), 151 Pages.

"3rd Generation Partnership Project; Technical Specification Group Radio Access Network; NR; Physical layer procedures for data (Release 16)", 3GPP TS 38.214 V16.2.0, Technical Specification, (Jun. 2020), 163 Pages.

"3rd Generation Partnership Project; Technical Specification Group Radio Access Network; NR; Physical layer procedures for control (Release 17)", 3GPP TS 38.213 V17.5.0, Technical Specification, (Mar. 2023), 262 Pages.

Sony, "Coverage recovery and capacity impact of Redcap devices," Agenda Item 8.6.3, 3GPP TSG RAN WG1 #102e, R1-2005581, Aug. 17-28, 2020, 6 pages.

Huawei, et al., "Identification and access restriction of Redcap UE," Agenda Item 8.12.2.2, 3GPP TSG RAN WG2 #111-e, R2-2007345, Aug. 17-28, 2020, 3 pages.

\* cited by examiner

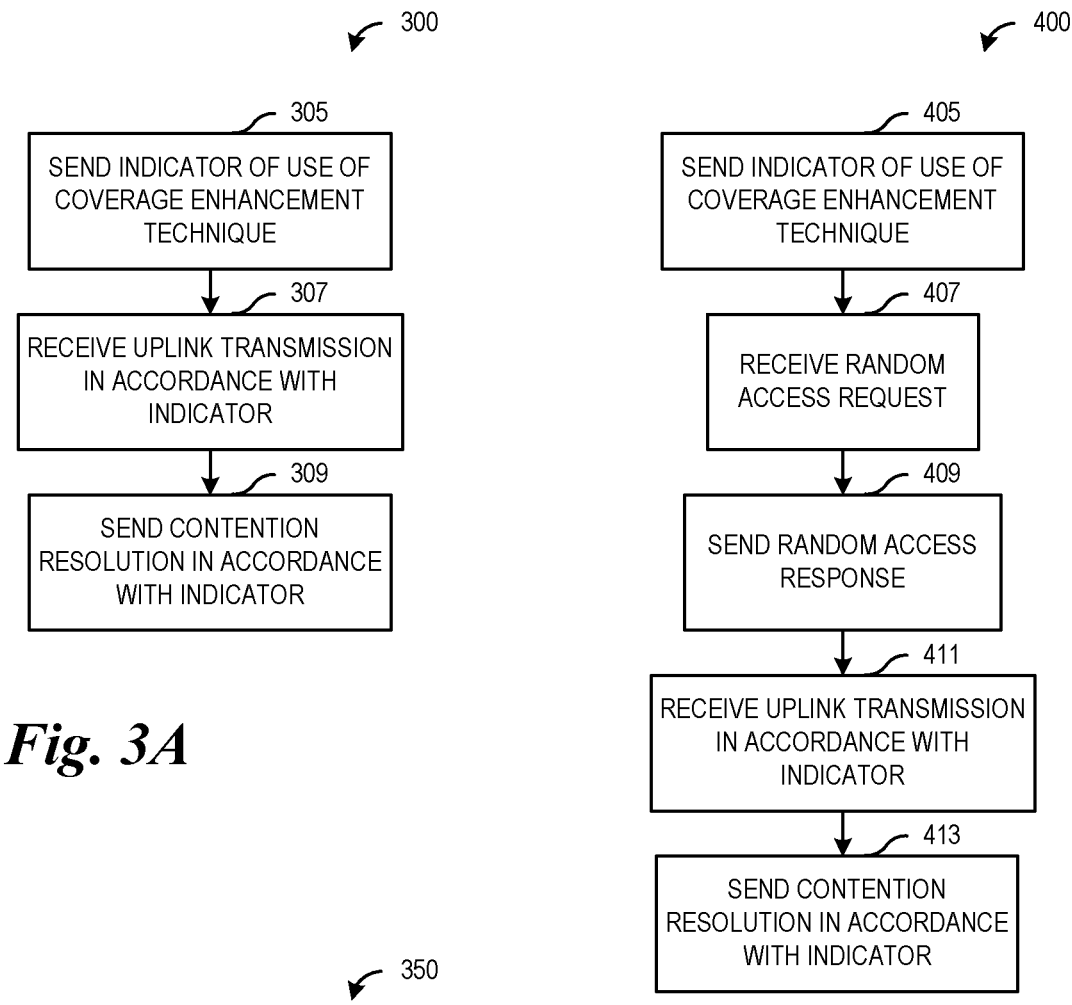
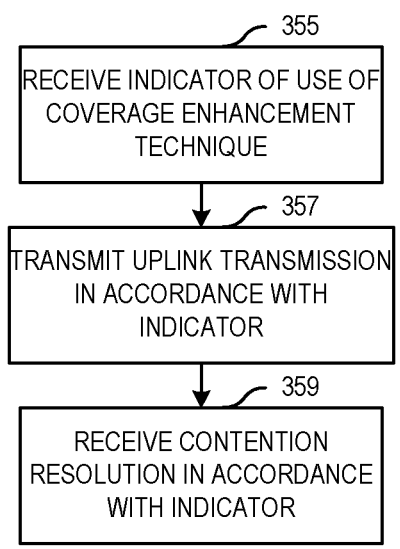
Fig. 3A
Fig. 3B
Fig. 4

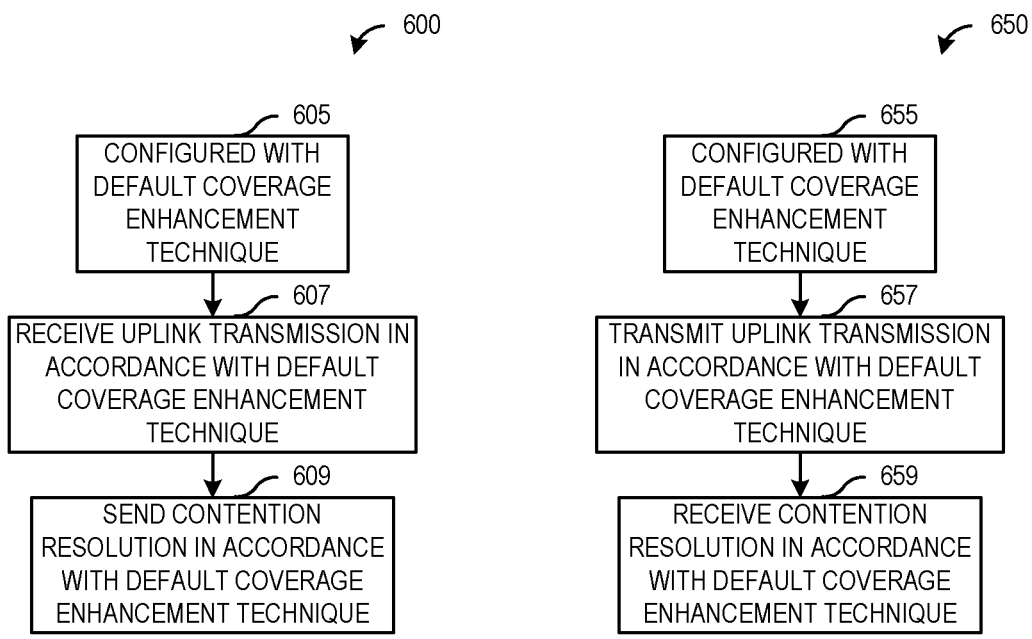
*Fig. 6A*  *Fig. 6B*

METHODS AND APPARATUS FOR COVERAGE ENHANCEMENT IN WIRELESS COMMUNICATION NETWORKS

CROSS-REFERENCE TO RELATED APPLICATIONS

This application is a continuation of International Patent Application No. PCT/US2021/044548, filed on Aug. 4, 2021, entitled "Methods and Apparatus for Coverage Enhancement in Wireless Communication Networks," which claims the benefit of U.S. Provisional Application No. 63/068,823, filed on Aug. 21, 2020, entitled "Apparatus and Methods for Configuration of MCS Table During Initial Access," applications of which are hereby incorporated herein by reference in their entireties.

TECHNICAL FIELD

The present disclosure relates generally to methods and apparatus for digital communications, and, in particular embodiments, to methods and apparatus for coverage enhancement in wireless communication networks.

BACKGROUND

The Third Generation Partnership Project (3GPP) has been developing and standardizing several important features with the Fifth Generation (5G) new radio (NR) technology. At a RAN Plenary meeting (RANP #86), a new study item (SI) targeting the support of reduced capacity (REDCAP) NR devices was approved. The SI includes the following:
- Identify and study potential user equipment (UE) complexity reduction features:
- Reduced number of UE receive/transmit (RX/TX) antennas,
- UE bandwidth reduction, with Release-15 secondary synchronization block (SSB) bandwidth being reused and Layer-1 changes minimized,
- Half-duplex frequency division duplexing (FDD),
- Relaxed UE processing time,
- Relaxed UE processing capability.

The complexity reduction techniques typically result in coverage degradation due to a loss in frequency diversity (from having smaller bandwidth) or reduced number of receive antennas (loss of diversity or spatial multiplexing), for example. Therefore, the following is defined for the SI: Functionality that will enable the performance degradation of such complexity reduction to be mitigated or limited will be studied, including coverage recovery to compensate for potential coverage reduction due to the complexity reduction of the device.

Therefore, there is a need for methods and apparatus for coverage enhancement in wireless communication networks.

SUMMARY

According to a first aspect, a method implemented by an access node is provided. The method comprising: sending, by the access node to a user equipment (UE), an indicator indicating use of coverage enhancement technique, the indicator being sent prior to the UE achieving a radio resource control (RRC) connected state with the access node; receiving, by the access node from the UE, an uplink transmission in accordance with the indicator; and sending, by the access node to the UE, a contention resolution message in accordance with the indicator.

In an implementation form of the method according to the first aspect, the indicator being sent in one of a master information block (MIB), a system information block (SIB), or a SIB redcap (SIB_RC).

In another implementation form of the method according to the first aspect or any preceding implementation form of the first aspect, further comprising: receiving, by the access node from the UE, a random access request; and sending, by the access node to the UE, a random access response with a transmission grant for the uplink transmission.

In another implementation form of the method according to the first aspect or any preceding implementation form of the first aspect, the indicator being sent in a random access response.

In another implementation form of the method according to the first aspect or any preceding implementation form of the first aspect, further comprising: receiving, by the access node from the UE, a random access request; and sending, by the access node to the UE, the random access response.

In another implementation form of the method according to the first aspect or any preceding implementation form of the first aspect, the indicator comprising an encoded random access response.

In another implementation form of the method according to the first aspect or any preceding implementation form of the first aspect, the encoded random access response being scrambled with a random access radio network temporary identifier (RA_RNTI).

In another implementation form of the method according to the first aspect or any preceding implementation form of the first aspect, the indicator being sent in a downlink control information (DCI).

In another implementation form of the method according to the first aspect or any preceding implementation form of the first aspect, further comprising: receiving, by the access node from the UE, a random access request; and sending, by the access node to the UE, the encoded random access response.

In another implementation form of the method according to the first aspect or any preceding implementation form of the first aspect, the indicator indicating at least one of a modulation and coding scheme (MCS) table, a repetition rate, or a frequency hopping technique.

According to a second aspect, a method implemented by a UE is provided. The method comprising: receiving, by the UE from an access node, an indicator indicating use of coverage enhancement technique, the indicator being received prior to the UE achieving a RRC connected state with the access node; transmitting, by the UE to the access node, an uplink transmission in accordance with the indicator; and receiving, by the UE from the access node, a contention resolution message in accordance with the indicator.

In an implementation form of the method according to the second aspect, the indicator being received in one of a MIB, a SIB, or a SIB_RC.

In another implementation form of the method according to the second aspect or any preceding implementation form of the second aspect, further comprising: transmitting, by the UE to the access node, a random access request; and receiving, by the UE from the access node, a random access response with a transmission grant for the uplink transmission.

In another implementation form of the method according to the second aspect or any preceding implementation form of the second aspect, the indicator being received in a random access response.

In another implementation form of the method according to the second aspect or any preceding implementation form of the second aspect, further comprising: transmitting, by the UE to the access node, a random access request; and receiving, by the UE from the access node, the random access response.

In another implementation form of the method according to the second aspect or any preceding implementation form of the second aspect, the indicator comprising an encoded random access response.

In another implementation form of the method according to the second aspect or any preceding implementation form of the second aspect, the encoded random access response being scrambled with a RA_RNTI.

In another implementation form of the method according to the second aspect or any preceding implementation form of the second aspect, the indicator being received in a DCI.

In another implementation form of the method according to the second aspect or any preceding implementation form of the second aspect, further comprising: transmitting, by the UE to the access node, a random access request; and receiving, by the UE from the access node, the encoded random access response.

In another implementation form of the method according to the second aspect or any preceding implementation form of the second aspect, the indicator indicating a MCS table.

According to a third aspect, an access node is provided. The access node comprising: one or more processors; and a non-transitory memory storage comprising instructions that, when executed by the one or more processors, cause the access node to: send, to a UE, an indicator indicating use of coverage enhancement technique, the indicator being sent prior to the UE achieving a RRC connected state with the access node; receive, from the UE, an uplink transmission in accordance with the indicator; and send, to the UE, a contention resolution message in accordance with the indicator.

In an implementation form of the access node according to the third aspect, the indicator being sent in one of a MIB, a SIB, or a SIB_RC.

In another implementation form of the access node according to the third aspect or any preceding implementation form of the third aspect, the instructions causing the access node to: receive, from the UE, a random access request; and send, to the UE, a random access response with a transmission grant for the uplink transmission.

In another implementation form of the access node according to the third aspect or any preceding implementation form of the third aspect, the indicator being sent in a random access response.

In another implementation form of the access node according to the third aspect or any preceding implementation form of the third aspect, the instructions causing the access node to: receive, from the UE, a random access request; and send, to the UE, the random access response.

In another implementation form of the access node according to the third aspect or any preceding implementation form of the third aspect, the indicator comprising an encoded random access response.

In another implementation form of the access node according to the third aspect or any preceding implementation form of the third aspect, the instructions causing the access node to: receive, from the UE, a random access request; and send, to the UE, the encoded random access response.

According to a fourth aspect, a UE is provided. The UE comprising: one or more processors; and a non-transitory memory storage comprising instructions that, when executed by the one or more processors, cause the UE to: receive, from an access node, an indicator indicating use of coverage enhancement technique, the indicator being received prior to the UE achieving a RRC connected state with the access node; transmit, to the access node, an uplink transmission in accordance with the indicator; and receive, from the access node, a contention resolution message in accordance with the indicator.

In an implementation form of the UE according to the fourth aspect, the indicator being received in one of a MIB, a SIB, or a SIB_RC.

In another implementation form of the UE according to the fourth aspect or any preceding implementation form of the fourth aspect, the instructions causing the UE to: transmit, to the access node, a random access request; and receive, from the access node, a random access response with a transmission grant for the uplink transmission.

In another implementation form of the UE according to the fourth aspect or any preceding implementation form of the fourth aspect, the indicator being received in a random access response.

In another implementation form of the UE according to the fourth aspect or any preceding implementation form of the fourth aspect, the instructions causing the UE to: transmit, to the access node, a random access request; and receive, from the access node, the random access response.

In another implementation form of the UE according to the fourth aspect or any preceding implementation form of the fourth aspect, the indicator comprising an encoded random access response.

In another implementation form of the UE according to the fourth aspect or any preceding implementation form of the fourth aspect, the instructions causing the UE to: transmit, to the access node, a random access request; and receive, from the access node, the encoded random access response.

An advantage of a preferred embodiment is that coverage enhancement techniques can be used during a random access procedure for initial access, thereby increasing the likelihood of initial access.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 3A illustrates a flow diagram of example operations occurring in an access node participating in enhancing the coverage of the RACH procedure with the coverage enhancement indicator according to example embodiments presented herein;

FIG. 3B illustrates a flow diagram of example operations occurring in a user equipment (UE) participating in enhancing the coverage of the RACH procedure with the coverage enhancement indicator according to example embodiments presented herein;

FIG. 4 illustrates a flow diagram of example operations occurring in an access node participating in enhancing the coverage of the RACH procedure with the coverage enhancement indicator being transmitted in an information block according to example embodiments presented herein;

FIG. 6A illustrates a flow diagram of example operations occurring in an access node participating in enhancing the coverage of the RACH procedure with a default coverage enhancement technique configuration according to example embodiments presented herein;

FIG. 6B illustrates a flow diagram of example operations occurring in a UE participating in enhancing the coverage of the RACH procedure with a default coverage enhancement technique configuration according to example embodiments presented herein;

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
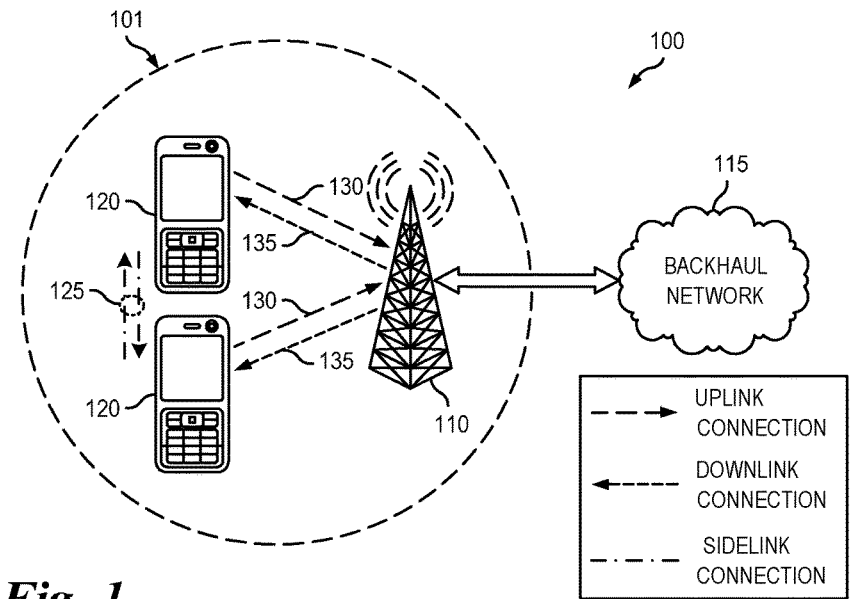
FIG. 1 illustrates a first example communications system.

FIG. 1 illustrates a first example communications system 100. Communications system 100 includes an access node 110, with coverage area 101, serving user equipments (UEs), such as UEs 120. Access node 110 is connected to a backhaul network 115 that provides connectivity to services and the Internet. In a first operating mode, communications to and from a UE passes through access node 110. In a second operating mode, communications to and from a UE do not pass through access node 110, however, access node 110 typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 130, and the communication links between the access node and UE is referred to as downlinks 135.

Access nodes may also be commonly referred to as Node Bs, evolved Node Bs (eNBs), next generation (NG) Node Bs (gNBs), master or primary eNBs (MeNBs), secondary eNBs (SeNBs), master or primary gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

As discussed previously, complexity reduction techniques under investigation for REDCAP UEs include: reduced number of UE receive/transmit (RX/TX) antennas; UE bandwidth reduction, with Release-15 secondary synchronization block (SSB) bandwidth being reused and Layer-1 changes minimized; half-duplex frequency division duplexing (FDD); relaxed UE processing time; or relaxed UE processing capability.

However, the complexity reduction techniques negatively impact overall performance. The complexity reduction techniques result in coverage reduction due to the loss in frequency diversity (from having a smaller bandwidth, for example) or reduced number of receive antennas (loss of diversity, spatial multiplexing, and so on). Therefore, there is a need for methods and apparatus for coverage enhancement.

As an example, existing Release-15 repetition in the time domain for the physical uplink shared channel (PUSCH) and the physical downlink shared channel (PDSCH) offers significant benefits for coverage enhancement. Moreover, lower modulation and coding scheme (MCS) tables offer gains in terms of coverage recovery. Table 1 illustrates MCS index table 3 for PDSCH from 3GPP TS 38.214 version 16.2.0, which is hereby incorporated herein by reference in its entirety.

TABLE 1

| MCS index table 3 for PDSCH. | | | |
|---|---|---|---|
| MCS Index $I_{MCS}$ | Modulation Order $Q_m$ | Target code Rate R x [1024] | Spectral efficiency |
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |

TABLE 1-continued

MCS index table 3 for PDSCH.

| MCS Index $I_{MCS}$ | Modulation Order $Q_m$ | Target code Rate R x [1024] | Spectral efficiency |
|---|---|---|---|
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 | reserved | |
| 30 | 4 | reserved | |
| 31 | 6 | reserved | |

In 3GPP LTE and NR compliant communications, a random access procedure is used to allow a UE to obtain initial access. The random access procedure is also commonly referred to as a random access channel (RACH) procedure. There are two types of RACH procedures: a contention-based RACH procedure and a contention-free RACH procedure.

Figure 2:
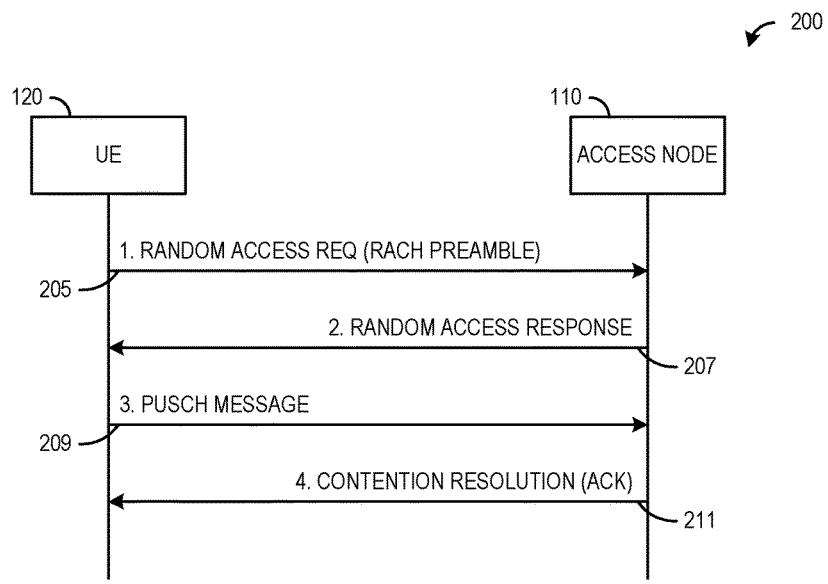
FIG. 2 illustrates a diagram of a prior art contention-based random access channel (RACH) procedure.

FIG. 2 illustrates a diagram 200 of a prior art contention-based RACH procedure. The prior art contention-based RACH procedure from Release-15 is a four step procedure involving UE 120 and access node 110, where UE 120 is attempting to obtain initial access. The RACH procedure begins with UE 120 selecting and transmitting a random access request to access node 110, the random access request comprising a random access preamble (event 205). UE 120 randomly selects one of a plurality of random access preambles and transmits the selected random access preamble in a physical random access channel (PRACH) occasion. Other UEs also attempting to obtain initial access may also random select random access preambles and transmit during the PRACH occasion, hence it is possible for a collision to occur.

Access node 110 receives the random access request and transmits a random access response to UE 120 (event 207). The random access response includes an identifier of the random access preamble (to identify the originator of the random access preamble (i.e., UE 120), timing information, an uplink transmission grant, and a network identifier assigned to UE 120. The random access response is transmitted over a physical downlink shared channel (PDSCH).

UE 120 transmits in the uplink in accordance with the uplink transmission grant (event 209). As an example, UE 120 transmits in a physical uplink shared channel (PUSCH) in accordance with the uplink transmission grant received in the random access response. Access node 110 transmits a contention resolution message (event 211). The contention resolution message may comprise an acknowledgement of the uplink transmission made by UE 120. However, if UE 120 does not receive the contention resolution message within a specified amount of time, UE 120 may deem that the contention resolution failed. UE 120 may retry the initial access by repeating the contention-based RACH procedure discussed herein.

In order to have successful uplink synchronization and obtaining the uplink transmission grant for initial attachment, the messages described in the contention-based RACH procedure should not be coverage limited, which may be the case for REDCAP UEs due to the deployment of complexity reduction techniques being investigated. However, the coverage enhancement techniques (e.g., repetition in the time domain, lower MCS tables, and so on) discussed previously are not implemented until after the RACH procedures are complete and the UE is in the radio resource control connected (RRC connected) state.

As an example, enabling time domain repetition of messages (e.g., the uplink transmission) is not feasible because the uplink transmission occurs before the UE is in the RRC connected state. As another example, using lower MCS tables is also not feasible because the enabling of the lower MCS tables is not supported until after the RACH procedure completes and the UE is in the RRC connected state. Other coverage enhancing techniques may involve frequency hopping techniques.

In 3GPP LTE for machine type communications (LTE-MTC), multiple coverage levels (referred to as coverage extensions (CE)) are defined based on reference signal received power (RSRP) measurements. Then, based on RSRP measurements made at the UE, some messages of the RACH procedure, namely the random access request (the RACH preamble), the random access response (the MPDCCH), and the contention resolution (the PDSCH) may be repeated multiple times, with the number of repetitions being dependent upon the measured RSRP. The multiple coverage levels are statically defined and operation is automatic based solely on the RSRP measurements.

According to an example embodiment, a coverage enhancement indicator of the use of a coverage enhancement technique is sent by the access node prior to the UE completes the RACH procedure and enters the RRC connected state. The sending of the coverage enhancement indicator prior to the UE completing the RACH procedure and entering the RRC connected state allows the utilization of the coverage enhancement technique in at least some of the communication occurring in the RACH procedure, thereby enhancing the coverage during the RACH procedure and improving the probability of successful completion of the RACH procedure. As an illustrated example, with knowledge of the coverage enhancement indicator, the UE knows the coverage enhancement technique utilized by the access node and is able to enhance the coverage of the PUSCH message transmitted in event 209 and the access node is able to enhance the coverage of the contention resolution message in event 211, which helps to improve the probability of success of the RACH procedure.

Although the discussion focuses on the RACH procedure and REDCAP UEs, the example embodiments presented herein are not limited to the RACH procedure or PDSCH and PUSCH. Rather, the example embodiments presented herein are operable with PDSCH data, PUSCH data, broadcast physical downlink control channel (PDCCH), and physical uplink control channel (PUCCH). Furthermore, the example embodiments are applicable to messages in other RACH procedures, such as the contention free RACH procedure and the two-step RACH procedure.

FIG. 3A illustrates a flow diagram of example operations 300 occurring in an access node participating in enhancing the coverage of the RACH procedure with the coverage enhancement indicator.

Operations 300 begin with the access node sending the coverage enhancement indicator (block 305). The coverage enhancement indicator indicates the use of a coverage enhancement technique, such as repetition in the time domain, frequency hopping, or a lower MCS table. The access node receives an uplink transmission from the UE in accordance with the coverage enhancement indicator (block 307). The uplink transmission may be the PUSCH message transmitted in event 209 of the RACH procedure. The utilization of the coverage enhancement technique helps to improve the likelihood of successful reception of the uplink transmission. The access node sends the contention resolution message in accordance with the coverage enhancement indicator (block 309). The contention resolution message may be the contention resolution message transmitted in event 211 of the RACH procedure. The utilization of the coverage enhancement technique helps to improve the likelihood of successful reception of the contention resolution message.

FIG. 3B illustrates a flow diagram of example operations 350 occurring in a UE participating in enhancing the coverage of the RACH procedure with the coverage enhancement indicator.

Operations 350 begin with the UE receiving the coverage enhancement indicator (block 355). The coverage enhancement indicator indicates the use of a coverage enhancement technique, such as repetition in the time domain, frequency hopping, or a lower MCS table. The UE transmits an uplink transmission to the access node in accordance with the coverage enhancement indicator (block 357). The uplink transmission may be the PUSCH message transmitted in event 209 of the RACH procedure. The utilization of the coverage enhancement technique helps to improve the likelihood of successful reception of the uplink transmission. The UE receives the contention resolution message in accordance with the coverage enhancement indicator (block 359). The contention resolution message may be the contention resolution message transmitted in event 211 of the RACH procedure. The utilization of the coverage enhancement technique helps to improve the likelihood of successful reception of the contention resolution message.

The system information consists of a master information block (MIB) and a number of system information blocks (SIBs), which are divided into minimum system information (SI) and other SI. The minimum SI comprises basic information required by the UEs for initial access. The minimum SI itself consists of MIB which contains cell barred status information and physical layer information of the cell required for the UE to receive further SI (for example, CORESET o configuration). The MIB is periodically broadcast on the broadcast channel (BCH).

In an embodiment, the coverage enhancement indicator is sent in an information block. The coverage enhancement indicator is sent in a MIB, a SIB, or a SIB for REDCAP UEs (SIB_RC), for example. The coverage enhancement indicator may be a field of the information block. As an example, the MIB includes the coverage enhancement indicator. As another example, the SIB (which is also referred to as remaining minimum system information (RMSI) periodically broadcasted on DL-SCH) includes the coverage enhancement indicator. REDCAP UEs may identify the coverage enhancement indicator in the SIB, while non-REDCAP UEs are configured to use default values which may be different. If the UE is in RRC IDLE state or RRC_INACTIVE state, the UE may use the indicated MCS table during RACH (for example during the uplink transmission). Upon reconfiguration in RRC connected state, the UE may use some other indicated MCS as configured by the access node.

As an example, if the lower MCS table is used, the coverage enhancement indicator may be included as a field in the MIB. An example MIB is as follows:

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |
| pdcch-ConfigSIB1 | PDCCH-ConfigSIB1, |
| cellBarred | ENUMERATED {barred, notBarred}, |
| intraFreqReselection | ENUMERATED {allowed, notAllowed}, |
| MCSTable3 | ENUMERATED {used, not used} |
| }, | | where $MCSTable_3$ is the coverage enhancement indicator indicating whether or not the lower MCS table is used.

As another example, if the lower MCS table is used, the coverage enhancement indicator may be included as a field in the SIB. An example addition to the SIB is as follows:

| $SIB_{1-V1710}$-IEs ::= | SEQUENCE { |
|---|---|
| $MCSTable_3$ | ENUMERATED{true} |
| }, | | where $MCSTable_3$ equal to true is an indicator that the lower MCS table is used to enhance coverage.

As another example, if the repetition in the time domain is used, the coverage enhancement indicator may be included as a field in the SIB. An example SIB is as follows:

| SIB1-V1710-IES :: = | SEQUENCE { |
|---|---|
| RepetitionTimeDomain | ENUMERATED{true} |
| }, | | where RepetitionTimeDomain equal to true is an indicator that the repetition in the time domain is used to enhance coverage.

As yet another example, a SIB_RC for REDCAP UEs includes the coverage enhancement indicator.

FIG. 4 illustrates a flow diagram of example operations 400 occurring in an access node participating in enhancing the coverage of the RACH procedure with the coverage enhancement indicator being transmitted in an information block.

Operations 400 begin with the access node sending the coverage enhancement indicator (block 405). The coverage enhancement indicator may be transmitted in the information block, such as the MIB, the SIB, or the SIB_RC, for example. The sending of the coverage enhancement indicator may occur in a two part process, where the coverage enhancement indicator is defined in the MIB and then indicated in another MIB or the SIB or SIB_RC.

The access node receives a random access request (block 407). The random access request comprises a random access preamble selected at random by the UE and transmitted to the access node as a random access request. In an embodiment, the random access request may be transmitted without the coverage enhancement. The access node transmits a random access response (block 409). The random access response includes an identifier of the random access preamble (to identify the originator of the random access preamble (i.e., the UE), timing information, an uplink transmission grant, and a network identifier assigned to the UE.

In an embodiment, the random access response may be transmitted without the coverage enhancement.

The access node receives the uplink transmission from the UE in accordance with the coverage enhancement indicator (block 411). The uplink transmission may utilize the lower MCS, repetition in the time domain, or both, in accordance with the coverage enhancement indicator. The uplink transmission is also received in accordance with the uplink transmission grant. The access node sends the contention resolution message in accordance with the coverage enhancement indicator (block 413). The sending of the contention resolution message may utilize the lower MCS, repetition in the time domain, or both, in accordance with the coverage enhancement indicator.

FIG. 4 illustrates example operations of the access node with the coverage enhancement indicator being transmitted in an information block. Example operations of the UE with the coverage enhancement indicator being received in an information block would be similar.

In an embodiment, the coverage enhancement indicator is sent in the random access response of the RACH procedure. Sending the coverage enhancement indicator in the random access response of the RACH procedure has an advantage in that the coverage enhancement technique being utilized may be tailored to meet the capability of the UE rather than a generic coverage enhancement technique being used for multiple UEs. Hence, a simple coverage enhancement technique may be used with UEs with very low capability, while a more complicated coverage enhancement technique may be used with UE with higher capability.

In an embodiment, the coverage enhancement indicator is transmitted dynamically. For example, the coverage enhancement indicator is included in a downlink control information (DCI) message transmitted along with the random access response. As an example, the coverage enhancement indicator is added explicitly to a DCI format 1_0 message that is transmitted with the random access response. The DCI format 1_0 message may be scrambled with the network identifier assigned to the UE, such as the random access radio network temporary identifier (RA_RNTI). In an embodiment, the coverage enhancement indicator comprises a 1-bit MCS table indicator and a multi-bit repetition number indicator. As an example, the 1-bit MCS table indicator indicates if the lower MCS table is being used (when set to a first value) or not being used (when set to a second value). As another example, the number of repetitions is indicated by the value of the multi-bit repetition number indicator. As yet another example, the multi-bit repetition number indicator is four bits long; however, other bit lengths are possible.

As an example, the coverage enhancement indicator is added implicitly to an existing DCI. The MCS scheme field of the DCI may be used to cover the lower MCS table entries. Other fields of the DCI may be used to implicitly convey the coverage enhancement indicator. All three MCS tables may be covered. As an example, the coverage enhancement indicator may be included in a new DCI dedicated to REDCAP UEs. The new DCI may include fields that enable the use of the lower MCS tables and/or repetition. Example fields include: a 1-bit MCS table indicator and a multi-bit repetition number indicator.

In an embodiment, the UE searches for the DCI in the common search space. The DCI format for scheduling the RAR message on PDSCH is DCI_format 1_0 scrambled with the RA_RNTI, for example. The fields of DCI_format 1_0 with cyclic redundancy check (CRC) scrambled by the RA_RNTI or are mentioned in the following from 3GPP TS 38.212 v 16.2.0, where the highlighted fields are one embodiment that may be used to indicate the MCS table and/or repetition number:

- Frequency domain resource assignment —$\lceil \log_2(N_{RB}^{DL,BWP}(N_{RB}^{DL,BWP}+1)/2)\rceil$ bits;
- $N_{RB}^{DL,BWP}$ is the size of CORESET 0 if CORESET 0 is configured for the cell and $N_{RB}^{DL,BWSP}$ is the size of initial DL bandwidth part if CORESET 0 is not configured for the cell;
- Time domain resource assignment—4 bits as defined in Clause 5.1.2.1 of [3GPP TS 38.212 v 16.2.0 and 3GPP TS 38.214];
- VRB-to-PRB mapping—1 bit according to Table 7.3.1.2.2-5;
- Modulation and coding scheme—5 bits as defined in Clause 5.1.3 of [3GPP TS 38.212 v 16.2.0 and 3GPP TS38.214], using Table 5.1.3.1-1;
- Modulation and coding table—1 bit;
- Repetition Number—4 bits;
- TB scaling—2 bits as defined in Clause 5.1.3.2 of [3GPP TS 38.212 v 16.2.0 and 3GPP TS 38.214]
- LSBs of SFN—2 bits for the DCI format 1-0 with CRC scrambled by MsgB-RNTI as defined in Clause 8.2A of [3GPP TS 38.331 and 3GPP TS 38.213]; or 2 bits for the DCI format 1_0 with CRC scrambled by RA-RNTI as defined in Clause 8.2 of [3GPP TS 38.331 and 3GPP TS 38.213] for operation in a cell with shared spectrum channel access; 0 bit otherwise;
- Reserved bits—14 bits for the DCI format 1_0 with CRC scrambled by MsgB-RNTI; or 14 bits for the DCI format 1_0 with CRC scrambled by RA-RNTI for operation in a cell with shared spectrum channel access; otherwise 16 bits.

The field Modulation and coding table may be as follows:
1 bit if the (Table 5.1.3.1-3 from 3GPP TS 38.214 v 16.2.0) is used;
0 bit otherwise.

In the above embodiment the field Modulation and coding table is a 1 bit field. In one embodiment the value 0 corresponds to not using (Table 5.1.3.1-3 from 3GPP TS 38.214 v 16.2.0) and value 1 corresponds to using the Table 5.1.3.1-3 from 3GPP TS 38.214 v 16.2.0.

In another embodiment, the value 0 corresponds to using Table 5.1.3.1-1 or Table 5.1.3.1-2 from 3GPP TS 38.214 v 16.2.0 while value 1 corresponds to using Table 5.1.3.1-3 from 3GPP TS 38.214 v 16.2.0. In yet another embodiment, the value 1 corresponds to using some other table other than Table 5.1.3.1-3 from 3GPP TS 38.214 v 16.2.0.

In yet another embodiment, the value 1 corresponds to not using Table 5.1.3.1-3 from 3GPP TS 38.214 v 16.2.0 and value o corresponds to using the Table 5.1.3.1-3 from 3GPP TS 38.214 v 16.2.0.

The values of 0 and 1 and what they correspond to may be interchangeable.

In yet another embodiment, the MCS table field is 2 bits. In this case, the indication may refer to Table 5.1.3.1-1, or Table 5.1.3.1-3, reserved, reserved.

The Repetition Number—4 bits is used to signal the number of repetition. In this particular embodiment, n=1, . . . , 16 repetitions may be signalled. However a different number of bits may be used such as 3 bits to signal number of repetitions n=1, 2, . . . , 8. In another embodiment, 2 bits may be used to signal number of repetitions n=1, 2, 3, 4. In yet another embodiment, 3 bits may be used to signal number of repetitions n=1, 2, 3, 4, reserved, reserved, reserved, reserved.

In an embodiment, either of the coverage enhancement techniques may be present in the DCI. In another embodiment, both may be indicated for further increase in coverage. If both are indicated, separate or joint indication may be used. For joint indication, a small table of, for example 2 bits, may indicate four combinations of repetition and MCS table selections, such as bits=00 no repetition normal MCS table, bits=01 repetition 2 normal table, bits=10 repetition 4 normal table, and bits=11 repetition 2 lower MCS table. The number of bits, as well as respective mappings, may be configurable.

Although the discussion focuses on DCI format 1_0, other DCI formats may be used for signaling the dynamic indication of the fields. A new DCI may be defined to include the fields including the coverage enhancement indicator.

Figures 5A, 5B:
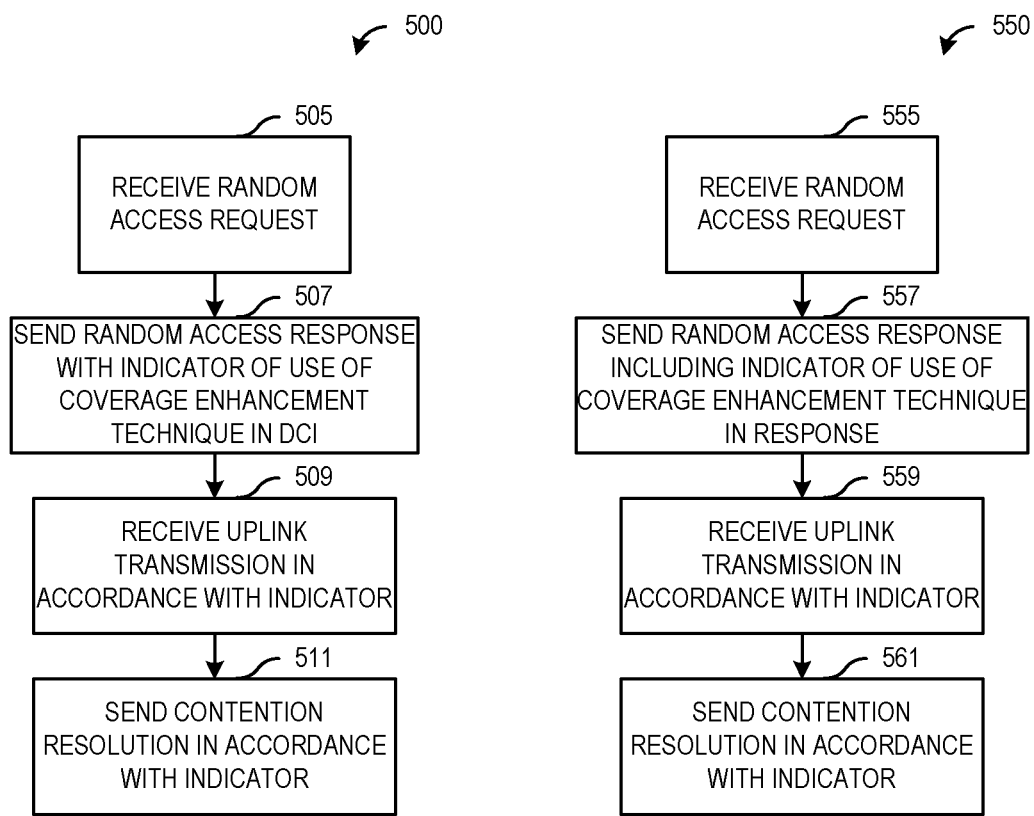
FIG. 5A illustrates a flow diagram of example operations occurring in an access node participating in enhancing the coverage of the RACH procedure with the coverage enhancement indicator being transmitted in a downlink control information (DCI) according to example embodiments presented herein.
FIG. 5B illustrates a flow diagram of example operations occurring in an access node participating in enhancing the coverage of the RACH procedure with the coverage enhancement indicator being transmitted in a random access response according to example embodiments presented herein.

FIG. 5A illustrates a flow diagram of example operations 500 occurring in an access node participating in enhancing the coverage of the RACH procedure with the coverage enhancement indicator being transmitted in a DCI.

Operations 500 begin with the access node receiving a random access preamble (block 505). The random access preamble may be received from the UE and is received without utilizing a coverage enhancement technique. The access node sends a random access response (block 507). The random access response includes the DCI with the coverage enhancement indicator. The random access response also includes the identifier of the random access preamble (to identify the originator of the random access preamble (i.e., the UE), timing information, the uplink transmission grant, and the network identifier assigned to UE. The random access response is sent without utilizing a coverage enhancement technique.

The access node receives the uplink transmission (block 509). The uplink transmission is received in accordance with the uplink transmission grant and is received in accordance with the coverage enhancement indicator. As an example, if the lower MCS table is indicated in the DCI transmitted in the random access response, the lower MCS table is used in receiving the uplink transmission. As another example, if repetition in the time domain is indicated in the DCI, time domain repetition is used in receiving the uplink transmission. The access node sends the contention resolution message (block 511). The contention resolution message is sent in accordance with the coverage enhancement indicator. As an example, if the lower MCS table is indicated in the DCI transmitted in the random access response, the lower MCS table is used in sending the contention resolution message. As another example, if repetition in the time domain is indicated in the DCI, time domain repetition is used in sending the contention resolution message.

FIG. 5A illustrates example operations of the access node with the coverage enhancement indicator being transmitted in a DCI. Example operations of the UE with the coverage enhancement indicator being received in a DCI would be similar.

The random access response is of fixed sized and consists of the following:
R: Reserved bit, set to "0";
Timing Advance Command: The Timing Advance Command field indicates the index value $T_A$ used to control the amount of timing adjustment that the MAC entity has to apply in 3GPP TS 38.213 and 3GPP TS 38.212 v 16.2.0. The size of the Timing Advance Command field is 12 bits;
UL Grant: The Uplink Grant field indicates the resources to be used on the uplink in 3GPP TS 38.213 and 3GPP TS 38.212 v 16.2.0. The size of the UL Grant field is 27 bits;
Temporary C-RNTI: The Temporary C-RNTI field indicates the temporary identity that is used by the MAC entity during Random Access. The size of the Temporary C-RNTI field is 16 bits.

In an embodiment, the coverage enhancement indicator is included in the random access response sent to the UE. In general, the random access response includes a timing advance command that indicates an index value used to control the amount of timing adjustment a media access control (MAC) entity applies, the uplink transmission grant that indicates resources in the uplink to use for the uplink transmission, and the network identifier assigned to the UE. The coverage enhancement indicator may be added to the random access response, e.g., the uplink transmission grant. The coverage enhancement indicator comprises a 1-bit MCS table indicator and a multi-bit repetition number indicator. As an example, the 1-bit MCS table indicator indicates if the lower MCS table is being used (when set to a first value) or not being used (when set to a second value). As another example, the number of repetitions is indicated by the value of the multi-bit repetition number indicator. As yet another example, the multi-bit repetition number indicator is four bits long; however, other bit lengths are possible. Although the discussion discusses the situation that the coverage enhancement indicator is included in the uplink transmission grant, other possibilities are possible. As an example, the coverage enhancement indicator is a separate entry in the random access response.

As discussed above, the uplink transmission grant may include the coverage enhancement indicator, such as:
MCS table: set to 1 bit if the Table 5.1.3.1-3 from 3GPP TS 38.212 is used; 0 otherwise.
Repetition: The Repetition field indicate the number of repetitions used for PUSCH (the uplink transmission). The size of Repetition field is 4 bits.

The variations and different embodiments related to the above two additional fields are similar to those mentioned previously, i.e., the embodiments regarding the different field sizes in the DCI and their interpretation are also applicable to the fields in the uplink transmission grant.

In an embodiment, the coverage enhancement indicator is included in the random access response, but not in the uplink transmission grant. An example random access response with the coverage enhancement indicator is as follows:
R: Reserved bit, set to "0";
Timing Advance Command: The Timing Advance Command field indicates the index value $T_A$ used to control the amount of timing adjustment that the MAC entity has to apply in TS 38.213 and 3GPP TS 38.212 v 16.2.0. The size of the Timing Advance Command field is 12 bits;
UL Grant: The Uplink Grant field indicates the resources to be used on the uplink in TS 38.213 and 3GPP TS 38.212 v 16.2.0. The size of the UL Grant field is 27 bits;
Temporary C-RNTI: The Temporary C-RNTI field indicates the temporary identity that is used by the MAC entity during Random Access. The size of the Temporary C-RNTI field is 16 bits;
MCS table: set to 1 bit if the Table 5.1.3.1-3 from 3GPP TS 38.214 v 16.2.0 is used; 0 otherwise;

Repetition: The Repetition field indicate the number of repetitions used for PUSCH Msg3. The size of Repetition field is 4 bits.

The variations and different embodiments related to the above two additional fields are similar to those mentioned previously, i.e., the embodiments regarding the different field sizes in the DCI and their interpretation are also applicable to the fields in the random access response.

The additional fields of the coverage enhancement indicator may be added to signal the use of coverage enhancement techniques such as MCS table and/or repetition (or any other configurable coverage enhancement technique such as frequency hopping). The MCS table field indicates the table to be used in the uplink to transmit Msg3 PUSCH. The repetition may also be used to indicate the number of repetition for Msg3 PUSCH. In one embodiment, the repetition field may be 4 bits for a number of repetition n=1, 2, . . . 16. In another embodiment, the number of repetitions is 3 bits for a number of repetitions n=1, 2, . . . 8.

FIG. 5B illustrates a flow diagram of example operations 550 occurring in an access node participating in enhancing the coverage of the RACH procedure with the coverage enhancement indicator being transmitted in a random access response.

Operations 550 begin with the access node receiving a random access preamble (block 555). The random access preamble may be received from the UE and is received without utilizing a coverage enhancement technique. The access node sends a random access response (block 557). The random access response includes the coverage enhancement indicator. The random access response also includes the identifier of the random access preamble (to identify the originator of the random access preamble (i.e., the UE), timing information, the uplink transmission grant, and the network identifier assigned to UE. The random access response is sent without utilizing a coverage enhancement technique.

The access node receives the uplink transmission (block 559). The uplink transmission is received in accordance with the uplink transmission grant and is received in accordance with the coverage enhancement indicator. As an example, if the lower MCS table is indicated in the random access response, the lower MCS table is used in receiving the uplink transmission. As another example, if repetition in the time domain is indicated in the DCI, time domain repetition is used in receiving the uplink transmission. The access node sends the contention resolution message (block 561). The contention resolution message is sent in accordance with the coverage enhancement indicator. As an example, if the lower MCS table is indicated in the random access response, the lower MCS table is used in sending the contention resolution message. As another example, if repetition in the time domain is indicated in the DCI, time domain repetition is used in sending the contention resolution message.

FIG. 5B illustrates example operations of the access node with the coverage enhancement indicator being transmitted in a random access response. Example operations of the UE with the coverage enhancement indicator being received in a random access response would be similar.

In some cases, the RedCap UEs may be identified by the access node, for example through the random access preamble, as being a REDCAP UE with reduced capabilities as opposed to a legacy UE. The random access preamble can be used to identify REDCAP UEs (or REDCAP UEs that require performance compensation) by dedicated RACH preambles or dedicated RACH occasions (opportunities to perform random access) in time or frequency. Other ways for identification exist, including dedicated synchronization or CORESET 0, dedicated bandwidth part (BWP), or access to a carrier dedicated only for REDCAP UEs. The access node may then configure a REDCAP specific default configuration which may include the repetition and/or lower MCS table or other coverage enhancement technique.

According to an example embodiment, the coverage enhancement technique is configured by default. The coverage enhancement technique used for a particular REDCAP UE or class (or group) of REDCAP UEs is configured by default. As an example, the coverage enhancement technique is programmed by a service provider. With the coverage enhancement technique being configured by default, once the access node identifies the UE as a particular REDCAP UE or a class (or group) of REDCAP UEs, the communication may utilize the coverage enhancement technique without requiring any additional signaling.

In an embodiment, the coverage enhancement technique is configured by default. That is, the uplink transmission transmitted by REDCAP UEs may then use the lower MCS table by default or use a default number of repetitions. In another embodiment, the default configuration (the REDCAP configuration) may then be changed to a different configuration, such as, for example, using a higher (or lower) number of repetition or using a different MCS table after being in RRC connected state. The contention resolution message transmitted by the access node may also use the lower MCS table or repetition as a default. In another embodiment, the default configuration may be changed after RRC connected state is achieved.

In some embodiments there may be multiple REDCAP UE types. These REDCAP UE types could be due to capability, such as maximum data rate, or due to channel condition, such as amount of required coverage enhancement, signal to noise ratio (SNR), RSRP, or some measure of channel quality. For simplicity, consider two types. A first REDCAP UE type is handled as a normal NR UE, for example, using the normal MCS table and no repetition. The second REDCAP UE type behaves with reduced capacity, as described in the above embodiments. This can be generalized to a multiple REDCAP UE type identification (such as through separate RACH resources or preambles, as discussed above) where a repetition, MCS table, or coverage technique is used on a per type basis.

With reference to the RACH procedure, the access node may be able to identify the UE as a REDCAP UE through the random access preamble received from the UE. The access node may then configure the coverage enhancement technique based on the default configuration associated with the REDCAP UE or REDCAP UE class (or group), enabling the access node to receive the uplink transmission in accordance with the coverage enhancement technique and send the contention resolution message in accordance with the coverage enhancement technique.

FIG. 6A illustrates a flow diagram of example operations 600 occurring in an access node participating in enhancing the coverage of the RACH procedure with a default coverage enhancement technique configuration.

Operations 600 begin with the access node being configured with the default coverage enhancement technique (block 605). The default coverage enhancement technique may be applied to different REDCAP UEs or REDCAP UE classes (or groups). As an example, the access node may be configured with a default coverage enhancement technique for specific REDCAP UEs, with different default coverage enhancement techniques for different REDCAP UEs. As another example, the access node may be configured with a default coverage enhancement technique for specific REDCAP UE classes (or groups), with different default coverage enhancement techniques for different REDCAP UE classes (or groups). The configuration may occur at initial power on or when there is a change in the default coverage enhancement technique configuration.

The access node receives the uplink transmission (block 607). The uplink transmission is received in accordance with the uplink transmission grant and is received in accordance with the default coverage enhancement technique associated with the REDCAP UE or REDCAP UE class (or group). The access node sends the contention resolution message (block 609). The contention resolution message is sent in accordance with the default coverage enhancement technique associated with the REDCAP UE or REDCAP UE class (or group).

FIG. 6B illustrates a flow diagram of example operations 650 occurring in a UE participating in enhancing the coverage of the RACH procedure with a default coverage enhancement technique configuration.

Operations 650 begin with the UE being configured with the default coverage enhancement technique (block 655). The default coverage enhancement technique may be provided to the UE by the service provider, during manufacture of the UE, for example. As an example, as the UE is being specifically configured for operation in a communication system of the service provider, the UE is configured with the default coverage enhancement technique.

The UE transmits the uplink transmission (block 657). The uplink transmission is transmitted in accordance with the uplink transmission grant and is transmitted in accordance with the default coverage enhancement technique configured for the UE. The UE receives the contention resolution message (block 609). The contention resolution message is received in accordance with the default coverage enhancement technique configured for the UE.

Figures 7, 8:
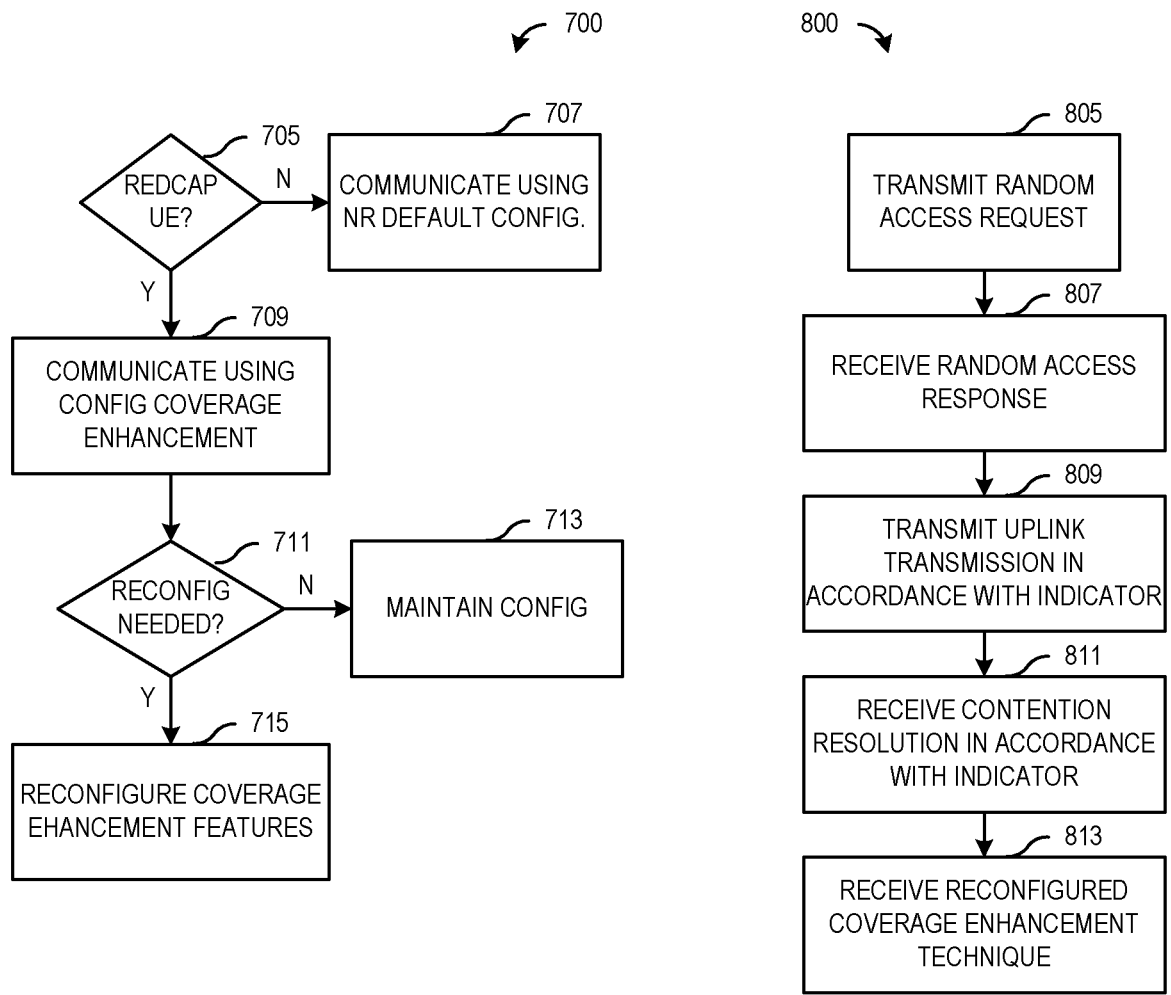
FIG. 7 illustrates a flow diagram of example operations occurring in an access node according to example embodiments presented herein.
FIG. 8 illustrates a flow diagram of example operations occurring in a UE according to example embodiments presented herein.

FIG. 7 illustrates a flow diagram of example operations 700 occurring in an access node.

Operations 700 begin with the access node performing a check to determine if the UE is a REDCAP UE (block 705). The access node may determine if the UE is a REDCAP UE based on a transmission received from the UE, for example. If the UE is not a REDCAP UE, the access node communicates with the UE using a NR default configuration (block 707). In other words, if the UE is not a REDCAP UE, there have not been any complexity reduction techniques implemented and the access node does not need to utilize any coverage enhancement techniques to try to enhance coverage.

If the UE is a REDCAP UE, the access node communicates using a configured coverage enhancement technique (block 709). The access node may communicate in accordance with a coverage enhancement indicator that may be transmitted in an information block (e.g., a MIB, SIB, or SIB_RC). Alternatively, the access node may communicate in accordance with a coverage enhancement indicator transmitted in the DCI of the random access response or included in the random access response. In yet another alternative, if a default coverage enhancement configuration has been configured for the REDCAP UE, the access node may communicate using the default coverage enhancement configuration.

The access node performs a check to determine if there is a need to reconfigure the coverage enhancement technique (block 711). As an example, the coverage enhancement technique may need to be reconfigured if the performance of the REDCAP UE is below expectations or if the operating environment is particularly noisy or has significant interferers, which makes the configured coverage enhancement technique less effective in enhancing coverage. If reconfiguration is not needed, the coverage enhancement technique configuration is maintained (block 713). If reconfiguration is needed, the coverage enhancement technique is reconfigured (block 715). Reconfiguring the coverage enhancement technique includes signaling of the reconfigured coverage enhancement technique, such as in the information block, the DCI of the random access response, or the random access response. Alternatively, the access node sends a message to the UE with the reconfigured coverage enhancement technique.

FIG. 8 illustrates a flow diagram of example operations 800 occurring in a UE.

Operations 800 begin with the UE selecting and transmitting a random access request to the access node, the random access request comprising a random access preamble (event 805). The UE receives the random access response from the access node (block 807). The random access response includes the identifier of the random access preamble (to identify the originator of the random access preamble, timing information, the uplink transmission grant, and a network identifier assigned to the UE. The DCI transmitted along with the random access response or the random access response may include the coverage enhancement indicator. Alternatively, the coverage enhancement indicator may be received in an information block. In yet another alternatively, the coverage enhancement technique used by the UE and the access node is configured by default.

The UE transmits the uplink transmission to the access node (block 809). The uplink transmission is made in accordance with the coverage enhancement technique associated with the UE. The UE receives the contention resolution message from the access node (block 811). The contention resolution message is received in accordance with the coverage enhancement technique associated with the UE.

The UE may receive the reconfigured coverage enhancement technique (block 813). If the access node has determined that there is a need to reconfigure the coverage enhancement technique for the UE, the UE may receive the reconfigured coverage enhancement technique in an information block (e.g., MIB, SIB, SIB_RC, etc.), in a DCI received with the random access response, or in the random access response.

Figure 9:
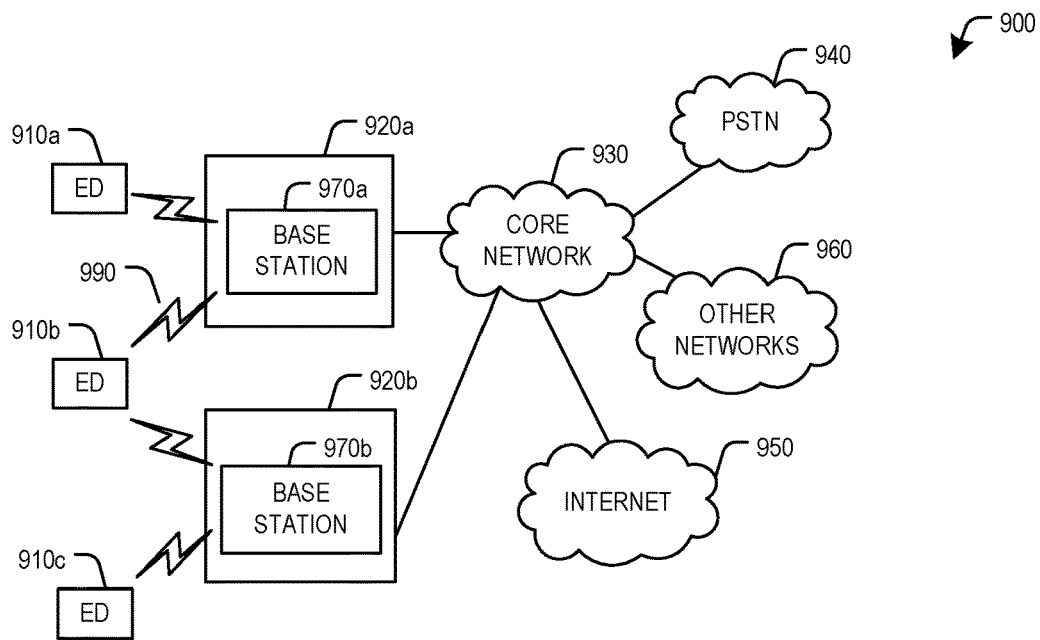
FIG. 9 illustrates an example communication system according to example embodiments presented herein.

FIG. 9 illustrates an example communication system 900. In general, the system 900 enables multiple wireless or wired users to transmit and receive data and other content. The system 900 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 900 includes electronic devices (ED) 910a-910c, radio access networks (RANs) 920a-920b, a core network 930, a public switched telephone network (PSTN) 940, the Internet 950, and other networks 960. While certain numbers of these components or elements are shown in FIG. 9, any number of these components or elements may be included in the system 900.

The EDs 910a-910c are configured to operate or communicate in the system 900. For example, the EDs 910a-910c are configured to transmit or receive via wireless or wired communication channels. Each ED 910a-910c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 920*a*-920*b* here include base stations 970*a*-970*b*, respectively. Each base station 970*a*-970*b* is configured to wirelessly interface with one or more of the EDs 910*a*-910*c* to enable access to the core network 930, the PSTN 940, the Internet 950, or the other networks 960. For example, the base stations 970*a*-970*b* may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 910*a*-910*c* are configured to interface and communicate with the Internet 950 and may access the core network 930, the PSTN 940, or the other networks 960.

In the embodiment shown in FIG. 9, the base station 970*a* forms part of the RAN 920*a*, which may include other base stations, elements, or devices. Also, the base station 970*b* forms part of the RAN 920*b*, which may include other base stations, elements, or devices. Each base station 970*a*-970*b* operates to transmit or receive wireless signals within a particular geographic region or area, sometimes referred to as a "cell." In some embodiments, multiple-input multiple-output (MIMO) technology may be employed having multiple transceivers for each cell.

The base stations 970*a*-970*b* communicate with one or more of the EDs 910*a*-910*c* over one or more air interfaces 990 using wireless communication links. The air interfaces 990 may utilize any suitable radio access technology.

It is contemplated that the system 900 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 920*a*-920*b* are in communication with the core network 930 to provide the EDs 910*a*-910*c* with voice, data, application, Voice over Internet Protocol (VoIP), or other services. Understandably, the RANs 920*a*-920*b* or the core network 930 may be in direct or indirect communication with one or more other RANs (not shown). The core network 930 may also serve as a gateway access for other networks (such as the PSTN 940, the Internet 950, and the other networks 960). In addition, some or all of the EDs 910*a*-910*c* may include functionality for communicating with different wireless networks over different wireless links using different wireless technologies or protocols. Instead of wireless communication (or in addition thereto), the EDs may communicate via wired communication channels to a service provider or switch (not shown), and to the Internet 950.

Although FIG. 9 illustrates one example of a communication system, various changes may be made to FIG. 9. For example, the communication system 900 could include any number of EDs, base stations, networks, or other components in any suitable configuration.

Figure 10A:
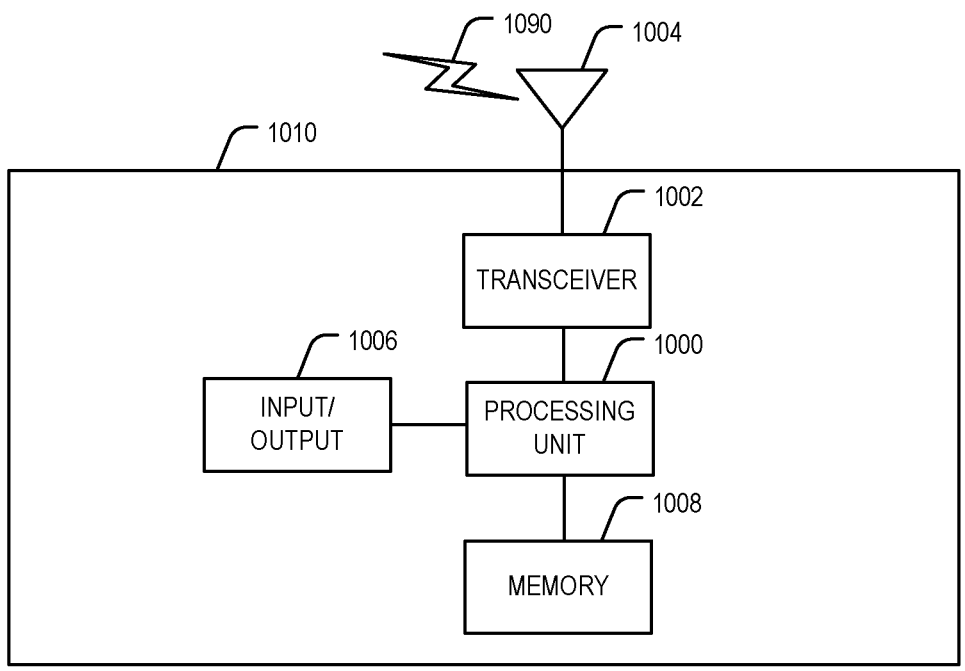
FIGS. 10A and 10B illustrate example devices that may implement the methods and teachings according to this disclosure.
Figure 10B:
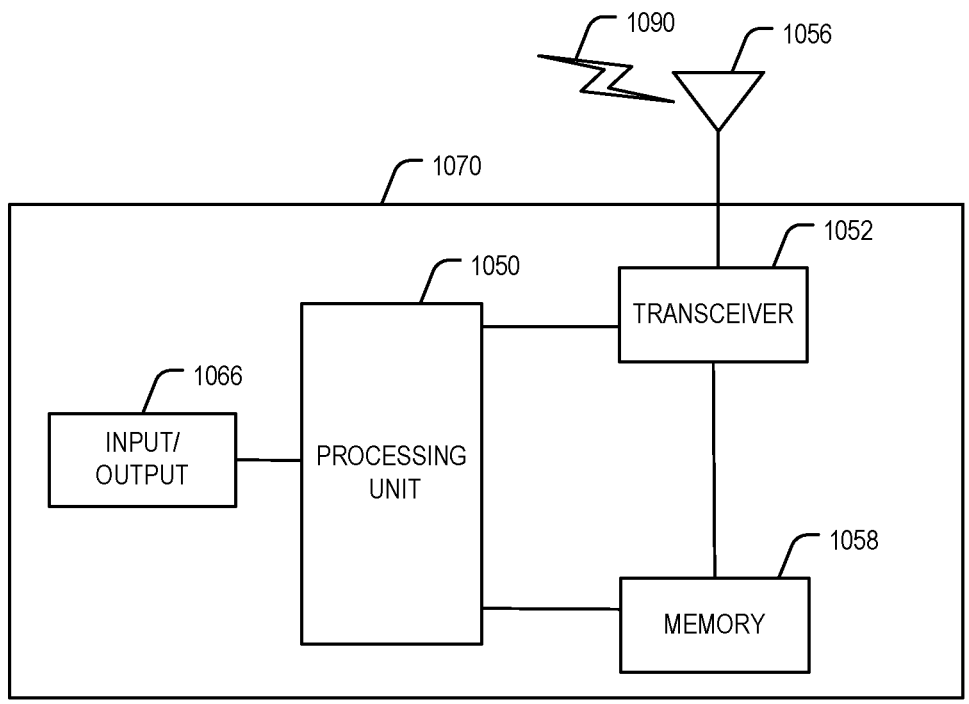

FIGS. 10A and 10B illustrate example devices that may implement the methods and teachings according to this disclosure. In particular, FIG. 10A illustrates an example ED 1010, and FIG. 10B illustrates an example base station 1070. These components could be used in the system 900 or in any other suitable system.

As shown in FIG. 10A, the ED 1010 includes at least one processing unit 1000. The processing unit 1000 implements various processing operations of the ED 1010. For example, the processing unit 1000 could perform signal coding, data processing, power control, input/output processing, or any other functionality enabling the ED 1010 to operate in the system 900. The processing unit 1000 also supports the methods and teachings described in more detail above. Each processing unit 1000 includes any suitable processing or computing device configured to perform one or more operations. Each processing unit 1000 could, for example, include a microprocessor, microcontroller, digital signal processor, field programmable gate array, or application specific integrated circuit.

The ED 1010 also includes at least one transceiver 1002. The transceiver 1002 is configured to modulate data or other content for transmission by at least one antenna or NIC (Network Interface Controller) 1004. The transceiver 1002 is also configured to demodulate data or other content received by the at least one antenna 1004. Each transceiver 1002 includes any suitable structure for generating signals for wireless or wired transmission or processing signals received wirelessly or by wire. Each antenna 1004 includes any suitable structure for transmitting or receiving wireless or wired signals. One or multiple transceivers 1002 could be used in the ED 1010, and one or multiple antennas 1004 could be used in the ED 1010. Although shown as a single functional unit, a transceiver 1002 could also be implemented using at least one transmitter and at least one separate receiver.

The ED 1010 further includes one or more input/output devices 1006 or interfaces (such as a wired interface to the Internet 950). The input/output devices 1006 facilitate interaction with a user or other devices (network communications) in the network. Each input/output device 1006 includes any suitable structure for providing information to or receiving information from a user, such as a speaker, microphone, keypad, keyboard, display, or touch screen, including network interface communications.

In addition, the ED 1010 includes at least one memory 1008. The memory 1008 stores instructions and data used, generated, or collected by the ED 1010. For example, the memory 1008 could store software or firmware instructions executed by the processing unit(s) 1000 and data used to reduce or eliminate interference in incoming signals. Each memory 1008 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 10B, the base station 1070 includes at least one processing unit 1050, at least one transceiver 1052, which includes functionality for a transmitter and a receiver, one or more antennas 1056, at least one memory 1058, and one or more input/output devices or interfaces 1066. A scheduler, which would be understood by one skilled in the art, is coupled to the processing unit 1050. The scheduler could be included within or operated separately from the base station 1070. The processing unit 1050 implements various processing operations of the base station 1070, such as signal coding, data processing, power control, input/output processing, or any other functionality. The processing unit 1050 can also support the methods and teachings described in more detail above. Each processing unit 1050 includes any suitable processing or computing device configured to perform one or more operations. Each processing unit 1050 could, for example, include a microprocessor, microcontroller, digital signal processor, field programmable gate array, or application specific integrated circuit.

Each transceiver 1052 includes any suitable structure for generating signals for wireless or wired transmission to one or more EDs or other devices. Each transceiver 1052 further includes any suitable structure for processing signals received wirelessly or by wire from one or more EDs or other devices. Although shown combined as a transceiver 1052, a transmitter and a receiver could be separate components. Each antenna 1056 includes any suitable structure for transmitting or receiving wireless or wired signals. While a common antenna 1056 is shown here as being coupled to the transceiver 1052, one or more antennas 1056 could be coupled to the transceiver(s) 1052, allowing separate antennas 1056 to be coupled to the transmitter and the receiver if equipped as separate components. Each memory 1058 includes any suitable volatile or non-volatile storage and retrieval device(s). Each input/output device 1066 facilitates interaction with a user or other devices (network communications) in the network. Each input/output device 1066 includes any suitable structure for providing information to or receiving/providing information from a user, including network interface communications.

Figure 11:
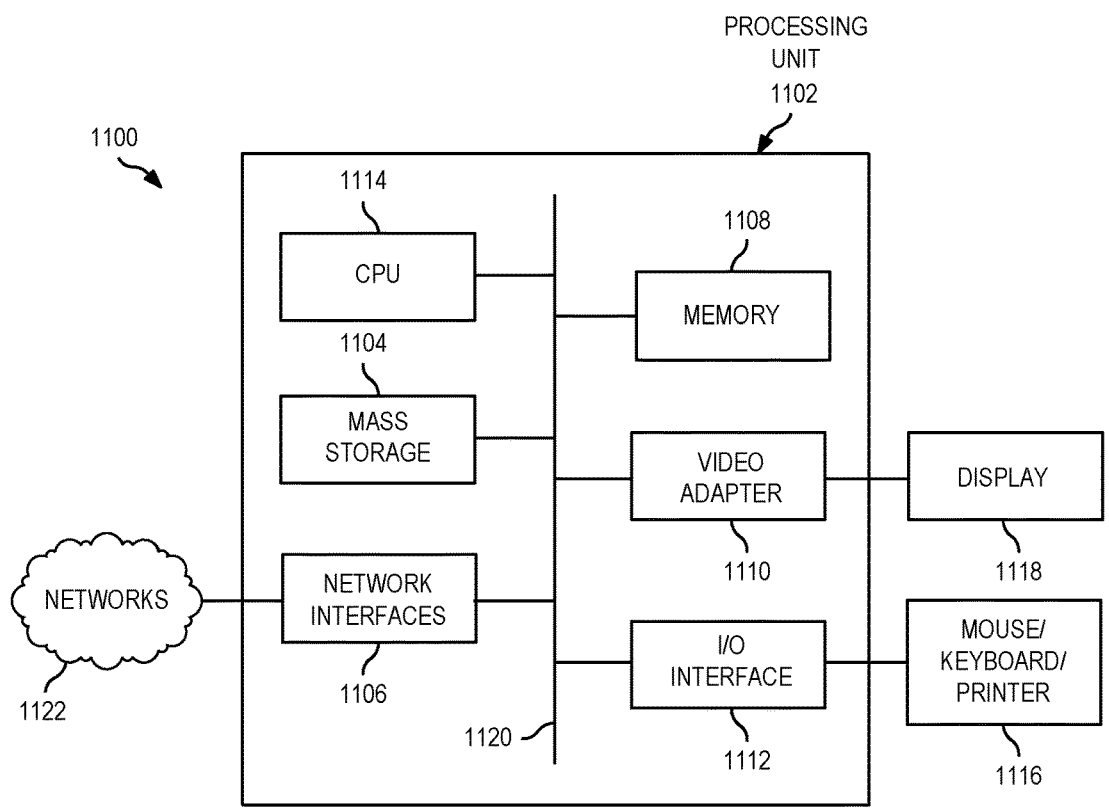
FIG. 11 is a block diagram of a computing system that may be used for implementing the devices and methods disclosed herein.

FIG. 11 is a block diagram of a computing system 1100 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1100 includes a processing unit 1102. The processing unit includes a central processing unit (CPU) 1114, memory 1108, and may further include a mass storage device 1104, a video adapter 1110, and an I/O interface 1112 connected to a bus 1120.

The bus 1120 may be one or more of any type of several bus architectures including a memory bus or memory controller, a peripheral bus, or a video bus. The CPU 1114 may comprise any type of electronic data processor. The memory 1108 may comprise any type of non-transitory system memory such as static random access memory (SRAM), dynamic random access memory (DRAM), synchronous DRAM (SDRAM), read-only memory (ROM), or a combination thereof. In an embodiment, the memory 1108 may include ROM for use at boot-up, and DRAM for program and data storage for use while executing programs.

The mass storage 1104 may comprise any type of non-transitory storage device configured to store data, programs, and other information and to make the data, programs, and other information accessible via the bus 1120. The mass storage 1104 may comprise, for example, one or more of a solid state drive, hard disk drive, a magnetic disk drive, or an optical disk drive.

The video adapter 1110 and the I/O interface 1112 provide interfaces to couple external input and output devices to the processing unit 1102. As illustrated, examples of input and output devices include a display 1118 coupled to the video adapter 1110 and a mouse, keyboard, or printer 1116 coupled to the I/O interface 1112. Other devices may be coupled to the processing unit 1102, and additional or fewer interface cards may be utilized. For example, a serial interface such as Universal Serial Bus (USB) (not shown) may be used to provide an interface for an external device.

The processing unit 1102 also includes one or more network interfaces 1106, which may comprise wired links, such as an Ethernet cable, or wireless links to access nodes or different networks. The network interfaces 1106 allow the processing unit 1102 to communicate with remote units via the networks. For example, the network interfaces 1106 may provide wireless communication via one or more transmitters/transmit antennas and one or more receivers/receive antennas. In an embodiment, the processing unit 1102 is coupled to a local-area network 1122 or a wide-area network for data processing and communications with remote devices, such as other processing units, the Internet, or remote storage facilities.

It should be appreciated that one or more steps of the embodiment methods provided herein may be performed by corresponding circuits, units, or modules. For example, a signal may be transmitted by a transmitting circuit, unit, or module. A signal may be received by a receiving circuit, unit, or module. A signal may be processed by a processing circuit, unit, or module. The respective circuits, units, or modules may be hardware, software, or a combination thereof. For instance, one or more of the circuits, units, or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the scope of the disclosure as defined by the appended claims.

What is claimed is:

1. A method implemented by an access node, the method comprising:
   transmitting, by the access node to a user equipment (UE), an indicator indicating use of a coverage enhancement technique, the indicator indicating a number of repetitions, and the indicator being sent prior to the UE achieving a radio resource control (RRC) connected state with the access node;
   receiving, by the access node from the UE, an uplink transmission of a random access channel (RACH) procedure in accordance with the indicator; and
   transmitting, by the access node to the UE, a contention resolution message of the RACH procedure in accordance with the indicator.

2. The method of claim 1, wherein the indicator is sent in one of a master information block (MIB), a system information block (SIB), or a SIB recap (SIB_RC).

3. The method of claim 1, wherein the indicator is included in a random access response scheduled by downlink control information (DCI), and wherein a cyclic redundancy check of the DCI is scrambled with a random access radio network temporary identifier (RA_RNTI).

4. The method of claim 3, wherein the indicator indicates the number of repetitions of the uplink transmission over a physical uplink shared channel (PUSCH), and wherein the random access response including the indicator is transmitted over a physical downlink shared channel (PDSCH).

5. The method of claim 1, wherein the indicator is included in downlink control information (DCI) that schedules a random access response.

6. The method of claim 1, wherein the indicator is included in downlink control information (DCI) that further indicates a modulation and coding scheme (MCS) table indicator for enabling use of a lower MCS table, the lower MCS table being used for sending the contention resolution message.

7. The method of claim 1, wherein the indicator further indicates at least one of a modulation and coding scheme (MCS) table or a frequency hopping technique.

8. A method implemented by a user equipment (UE), the method comprising:
receiving, by the UE from an access node, an indicator indicating use of a coverage enhancement technique, the indicator indicating a number of repetitions, and the indicator being received prior to the UE achieving a radio resource control (RRC) connected state with the access node;
transmitting, by the UE to the access node, an uplink transmission of a random access channel (RACH) procedure in accordance with the indicator; and
receiving, by the UE from the access node, a contention resolution message of the RACH procedure in accordance with the indicator.

9. The method of claim 8, wherein the indicator is received in one of a master information block (MIB), a system information block (SIB), or a SIB redcap (SIB_RC).

10. The method of claim 8, wherein the indicator is included in a random access response scheduled by downlink control information (DCI), and wherein a cyclic redundancy check of the DCI is scrambled with a random access radio network temporary identifier (RA_RNTI).

11. The method of claim 8, wherein the indicator is included in downlink control information (DCI) that schedules a random access response.

12. The method of claim 8, wherein the indicator is included in downlink control information (DCI) that further indicates a modulation and coding scheme (MCS) table indicator for enabling use of a lower MCS table, the lower MCS table being used for sending the contention resolution message.

13. The method of claim 8, wherein the indicator further indicates at least one of a modulation and coding scheme (MCS) table or a frequency hopping technique.

14. An apparatus, applied to an access node, the apparatus comprising:
one or more processors; and
a non-transitory memory storage storing instructions that, when executed by the one or more processors, cause the access node to perform operations including:
transmitting, to a user equipment (UE), an indicator indicating use of a coverage enhancement technique, the indicator indicating a number of repetitions, and the indicator being sent prior to the UE achieving a radio resource control (RRC) connected state with the access node;
receiving, from the UE, an uplink transmission of a random access channel (RACH) procedure in accordance with the indicator; and
transmitting, to the UE, a contention resolution message of the RACH procedure in accordance with the indicator.

15. The apparatus of claim 14, wherein the indicator is included in a random access response scheduled by downlink control information (DCI), and wherein a cyclic redundancy check of the DCI is scrambled with a random access radio network temporary identifier (RA_RNTI).

16. The apparatus of claim 14, wherein the indicator is included in downlink control information (DCI) that schedules a random access response.

17. The apparatus of claim 14, wherein the indicator is included in downlink control information (DCI) that further indicates a modulation and coding scheme (MCS) table indicator for enabling use of a lower MCS table, the lower MCS table being used for sending the contention resolution message.

18. An apparatus, applied to a user equipment (UE), the apparatus comprising:
one or more processors; and
a non-transitory memory storage storing instructions that, when executed by the one or more processors, cause the UE to perform operations including:
receiving, from an access node, an indicator indicating use of a coverage enhancement technique, the indicator indicating a number of repetitions, and the indicator being received prior to the UE achieving a radio resource control (RRC) connected state with the access node;
transmitting, to the access node, an uplink transmission of a random access channel (RACH) procedure in accordance with the indicator; and
receiving, from the access node, a contention resolution message of the RACH procedure in accordance with the indicator.

19. The apparatus of claim 18, wherein the indicator is included in a random access response scheduled by downlink control information (DCI), and wherein a cyclic redundancy check of the DCI is scrambled with a random access radio network temporary identifier (RA_RNTI).

20. The apparatus of claim 18, wherein the indicator is included in downlink control information (DCI) that schedules a random access response.

21. The apparatus of claim 18, wherein the indicator is included in downlink control information (DCI) that further indicates a modulation and coding scheme (MCS) table indicator for enabling use of a lower MCS table, the lower MCS table being used for sending the contention resolution message.

* * * * *